US010235283B2

(12) United States Patent
Barzik et al.

(10) Patent No.: US 10,235,283 B2
(45) Date of Patent: Mar. 19, 2019

(54) TECHNIQUES FOR SUPPORTING IN-PLACE UPDATES WITH A LOG-STRUCTURED ARRAY CONTROLLER

(71) Applicant: INTERNATIONAL BUSINESS MACHINES CORPORATION, Armonk, NY (US)

(72) Inventors: Zah Barzik, Tel-Aviv (IL); Nikolas Ioannou, Rüschlikon (CH); Ioannis Koltsidas, Rüschlikon (CH); Amit Margalit, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/458,689

(22) Filed: Mar. 14, 2017

(65) Prior Publication Data

US 2018/0267893 A1 Sep. 20, 2018

(51) Int. Cl.

*G06F 12/00* (2006.01)
*G06F 12/02* (2006.01)
*G06F 12/1009* (2016.01)

(52) U.S. Cl.

CPC ...... *G06F 12/0246* (2013.01); *G06F 12/1009* (2013.01); *G06F 2212/1044* (2013.01);
(Continued)

(58) Field of Classification Search

CPC ............. G06F 12/0246; G06F 12/1009; G06F 2212/1044; G06F 2212/2022; G06F 2212/7201; G06F 2212/7205
See application file for complete search history.

(56) References Cited

U.S. PATENT DOCUMENTS

| | | | | |
|---|---|---|---|---|
| 6,968,351 | B2 | 11/2005 | Butterworth | |
| 9,251,067 | B1 * | 2/2016 | Tomlin | G06F 12/0284 |

(Continued)

FOREIGN PATENT DOCUMENTS

| | | |
|---|---|---|
| JP | 2015516613 | 6/2015 |
| JP | 2016071894 | 5/2016 |

OTHER PUBLICATIONS

Disclosed anonymously. (2014). Passing information from Host to a Flash System to help improve performance and decrease write amplification. IPCOM000236795D.

(Continued)

*Primary Examiner* — Kalpit Parikh
(74) *Attorney, Agent, or Firm* — Michael R. Long; Randall J. Bluestone

(57) ABSTRACT

A technique for supporting in-place updates in a data storage system includes in response to garbage collection for a logical block address (LBA) being indicated, determining whether an in-place update to the LBA is pending. In response to one or more in-place updates to the LBA being pending prior to the garbage collection for the LBA being indicated, the garbage collection for the LBA is initiated following completion of the one or more in-place updates to the LBA. In response to the one or more in-place updates to the LBA not being pending prior to the garbage collection for the LBA being indicated, the garbage collection for the LBA is completed prior to any subsequent in-place update to the LBA that occurs subsequent to initiation and prior to completion of the garbage collection for the LBA.

17 Claims, 13 Drawing Sheets

(52) U.S. Cl.
CPC ................ *G06F 2212/2022* (2013.01); *G06F 2212/7201* (2013.01); *G06F 2212/7205* (2013.01)

(56) References Cited

U.S. PATENT DOCUMENTS

| | | | | |
|---|---|---|---|---|
| 9,858,289 | B2 | 1/2018 | Ioannou | |
| 2006/0184720 | A1* | 8/2006 | Sinclair | G06F 12/0246 711/103 |
| 2014/0195725 | A1* | 7/2014 | Bennett | G06F 12/0246 711/103 |
| 2016/0041902 | A1 | 2/2016 | Atkisson et al. | |
| 2016/0179398 | A1 | 6/2016 | Ioannou et al. | |

OTHER PUBLICATIONS

Debnath, B., Sengupta, S., & Li, J. (2010). FlashStore: high throughput persistent key-value store. Proceedings of the VLDB Endowment, 3(1-2), 1414-1425.

J. Menon (1995). A performance comparison of RAID-5 log-structured arrays8, in Proceedings of the 4th IEEE International Symposium on High Performance Distributed Computing.

* cited by examiner

TECHNIQUES FOR SUPPORTING IN-PLACE UPDATES WITH A LOG-STRUCTURED ARRAY CONTROLLER

BACKGROUND OF THE INVENTION

This disclosure relates to data processing and storage, and more specifically, to techniques for supporting in-place updates with a log-structured array controller in a data storage system, such as a flash memory system.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

BRIEF SUMMARY

A technique for supporting in-place updates in a data storage system includes determining whether an in-place update to a logical block address (LBA) is pending in response to garbage collection for the LBA being indicated. In response to one or more in-place updates to the LBA being pending prior to the garbage collection for the LBA being indicated, the garbage collection for the LBA is initiated following completion of the one or more in-place updates to the LBA. In response to the one or more in-place updates to the LBA not being pending prior to the garbage collection for the LBA being indicated, the garbage collection for the LBA is completed prior to any subsequent in-place update to the LBA that occurs subsequent to initiation and prior to completion of the garbage collection for the LBA.

The disclosed techniques may be implemented as a method, a data storage system, and/or a program product (including program code stored in a storage device).

DETAILED DESCRIPTION

Figure 1A:
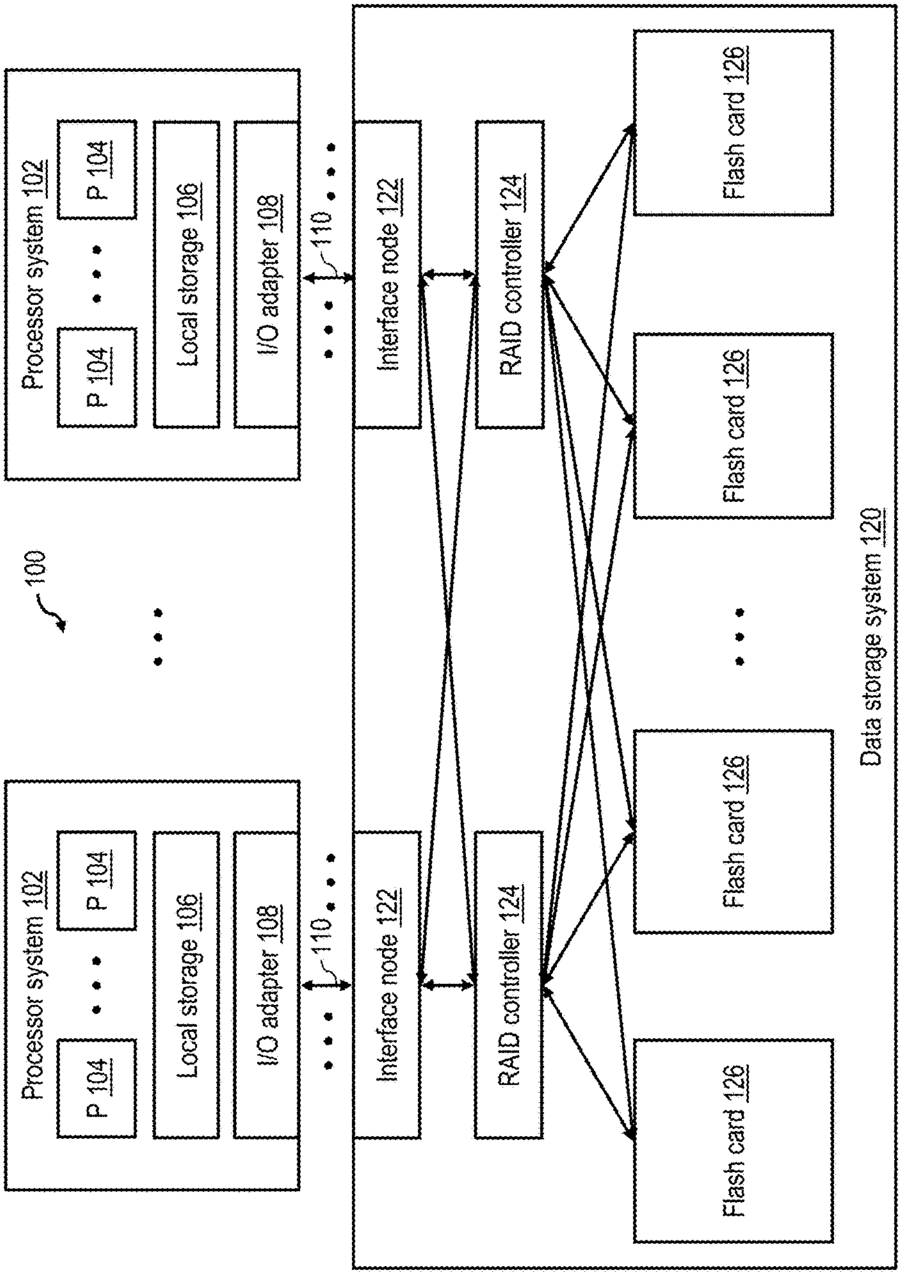
FIG. 1A is a high level block diagram of a data processing environment in accordance with one embodiment.

Performance characteristics of NAND flash-based Solid State Disks (SSDs) are fundamentally different from traditional Hard Disk Drives (HDDs). With SSDs, data is organized in pages of typically 4, 8, or 16 kB sizes. With SSDs, page read operations are typically one order of magnitude faster than write operations and latency neither depends on a current operation location nor a previous operation location. However, with SSDs memory locations must be erased prior to being written. The size of an erase block unit in an SSD is typically 256 pages and page erase operations take approximately one order of magnitude more time than a page program operation. Due to the intrinsic properties of NAND flash technology, SSDs have written data out-of-place which requires the maintenance of a mapping table commonly referred to as a logical-to-physical translation (LPT) table, which maps logical block addresses (LBAs) to physical block addresses (PBAs).

As flash chips/blocks/pages may experience errors or complete failure due to limited endurance or other reasons, additional redundancy (e.g., error correcting code (ECC) such as BCH) has been used within flash pages, as well as across flash chips using, for example, RAID-5 or RAID-6 like schemes). While the addition of ECC in pages is straightforward, the organization of flash blocks into RAID-like stripes is more complex because individual blocks have to be retired over time which requires either stripe reorganization or shrinking stripe capacity. Many SSDs now implement a so-called log-structured array (LSA) architecture that combines stripe organization and LPT table mapping to define data placement.

With out-of-place writes, a write operation writes new data to a new location in flash and updates mapping information, effectively invalidating old data at an old location. With flash, an invalidated data location cannot be reused until an associated block to which the invalidate data location belongs has been erased. Before a block may be erased, the block must be garbage collected, which means that any valid data in the block needs to be relocated to a new block. Garbage collection of a block is typically deferred for as long as possible to reduce the number of valid pages that are required to be relocated, as relocating pages requires additional write operations, commonly referred to as write amplification. Since NAND flash has limited endurance, i.e., each cell can only endure a limited number of program/erase cycles, achieving a low write amplification is desirable. In fact, as NAND flash technology has shrunk endurance has further decreased and, as such, write reduction or write elimination is even more desirable.

Garbage collection in the context of flash controllers refers to the process of identifying blocks of pages (or block-stripes depending on the specific controller and the respective garbage collection unit of operation) to be reclaimed for future usage and relocating all still valid pages within the identified blocks that are to be garbage collected to another block. A garbage collection unit of operation is usually referred to as a Logical Erase Block (LEB). It should be noted that an LEB, which is the unit of physical erasure, may be a multiple of physical flash blocks. For example, in a RAID scheme multiple flash blocks may be grouped together in a stripe that cannot be reclaimed individually, as RAID parity is computed against the data in all blocks in the stripe. In this case, a full stripe is garbage collected as a single unit. Garbage collecting an LEB entails the relocation of any valid logical pages within the LEB to new physical pages and subsequently erasing the blocks of the LEB to prepare the blocks to be repopulated with new logical pages. As previously mentioned, the amount of data relocated due to garbage collection relocation of valid pages constitutes garbage collection induced write amplification.

According to the present disclosure, techniques that support in-place updates for an LSA controller optimized for flash that operates on top of an array of one or more storage devices (e.g., SSDs, HDDs) is disclosed. The techniques take advantage of the fact that a level below the LSA controller can accept in-place updates by having, for example, a lower-level LSA controller, some other kind of re-direction mechanism, or natively supporting in-place updates. An LSA controller maintains mappings on a logical page granularity (e.g., 4 kB), but accepts I/O that can be smaller than the logical page granularity (e.g., typically a sector of 512 B). If the supported I/O granularity is smaller than the mapped logical page granularity, then a given write I/O can be distinguished based on whether the write I/O is aligned and an integer multiple of the logical page size (i.e., is write-aligned) or is not write-aligned (i.e., is write-unaligned). As used herein the term 'LBA' refers to a unique logical page address and the term 'PBA' refers to a unique physical page address that is of equal size to the logical page.

The disclosed techniques facilitate unaligned writes of an LBA with in-place update support and relocation of a PBA with in-place update support. The disclosed techniques assume an LSA controller that is configured to perform a read-modify-write at an LBA sized granularity to service unaligned writes, but are broadly applicable to other storage controllers that implement in-place update capability. As one example, if an LBA size is 8 kB and a user requests a 4 kB write then a storage controller reads the 8 kB LBA, updates the 4 kB of user data that is to be written, and then writes the merged 8 kB data to a new PBA. It should be appreciated that the performance of a read-modify-write at an LBA sized granularity to service unaligned writes has conventionally introduced I/O amplification (both read and write) that can significantly reduce the performance of an associated storage system in the event unaligned writes comprise a significant portion of a storage system workload.

With reference to the figures and with particular reference to FIG. 1A, there is illustrated a high level block diagram of an exemplary data processing environment 100 including a data storage system 120 that is configured to perform in-place updates according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an Input/Output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
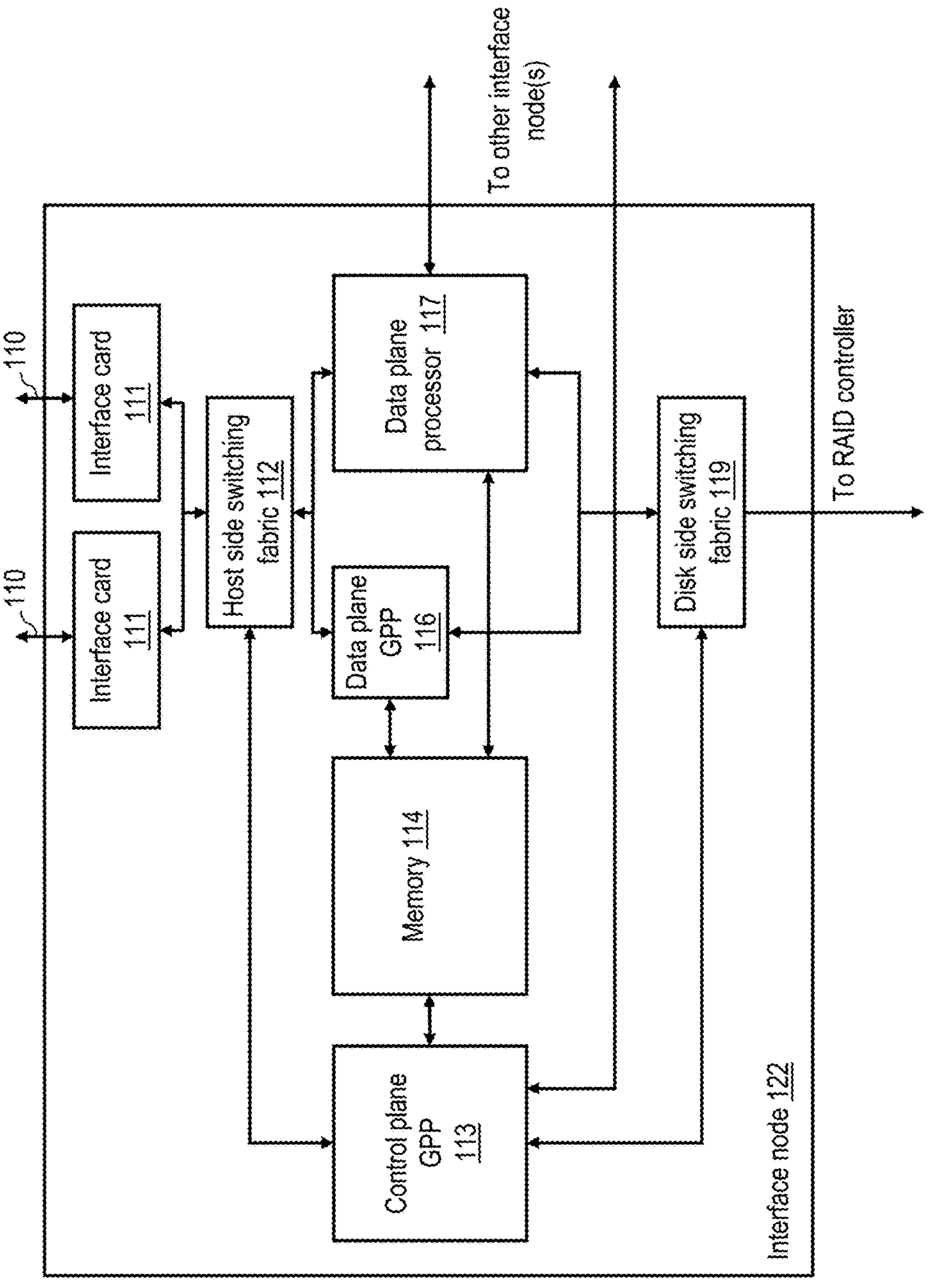
FIG. 1B is a more detailed block diagram of an exemplary interface node of the data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA)). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to flash cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
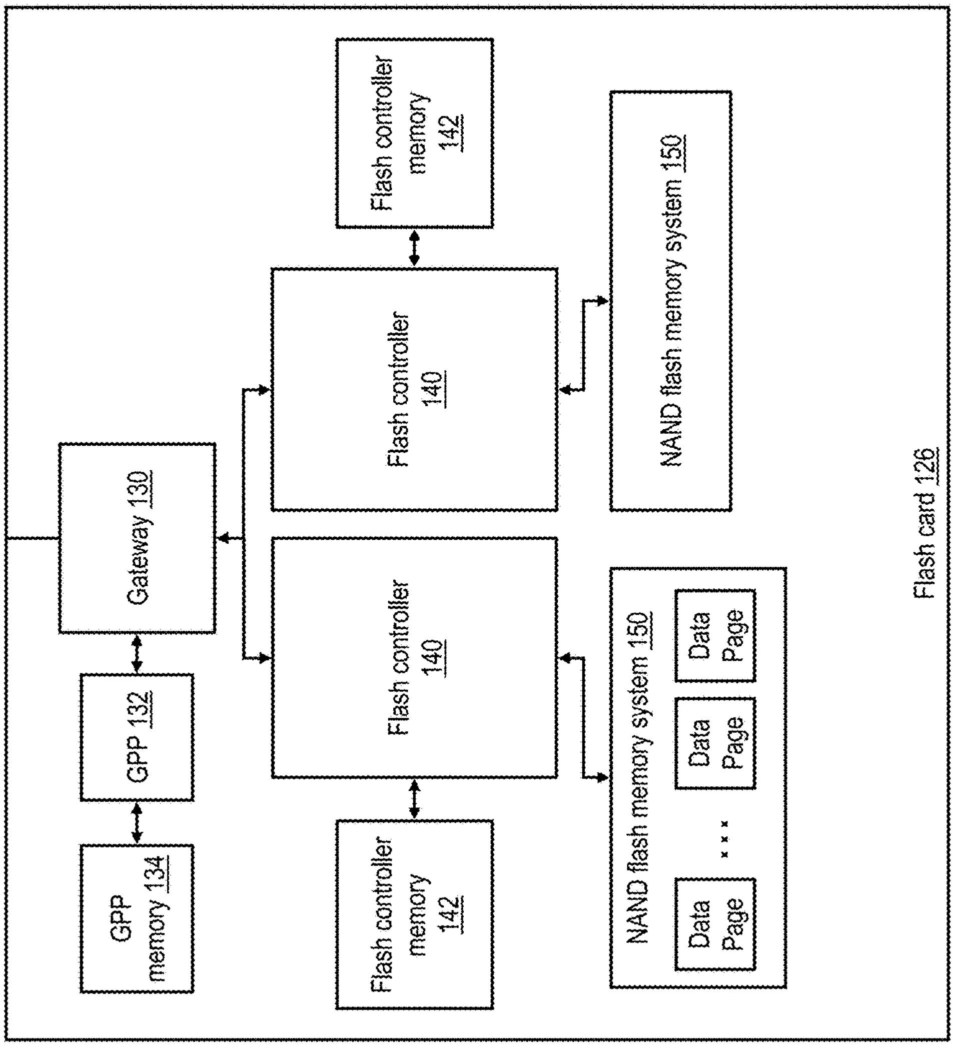
FIG. 1C is a more detailed block diagram of an exemplary flash card of the data storage system of FIG. 1A.

FIG. 1C depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1C) associated with NAND flash memory systems 150.

Flash controllers 140 implement a Flash Translation Layer (FTL) that provides logical-to-physical address translation to enable access to specific memory locations within NAND flash memory systems 150. In general, an TOP received by flash controller 140 from a host device, such as a processor system 102, contains the logical block address (LBA) at which the data is to be accessed (read or written) and, if a write TOP, the write data to be written to data storage system 120. The TOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write TOP is fixed at the size of a single flash memory page, for example, 16 kilobytes (kB). The LBA provided by the host device corresponds to a logical page within a logical address space, the logical page typically having a size of four (4) kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed page sizes of data pages stored in NAND flash memory system 150 and even further their CRC values.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
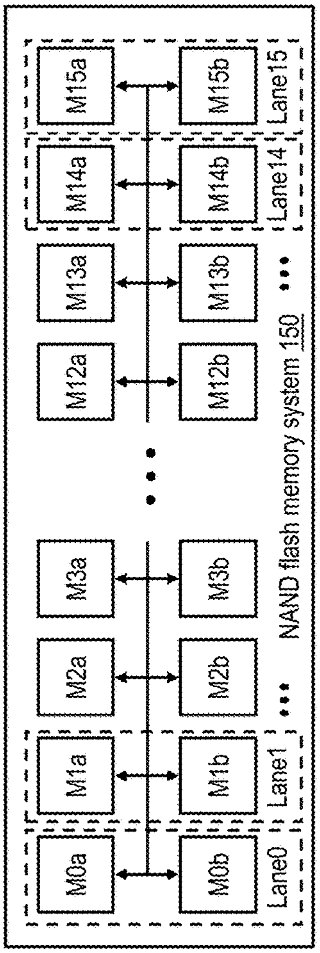
FIGS. 2-5 illustrate an exemplary arrangement of physical memory within a NAND flash memory system in accordance with an embodiment of the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
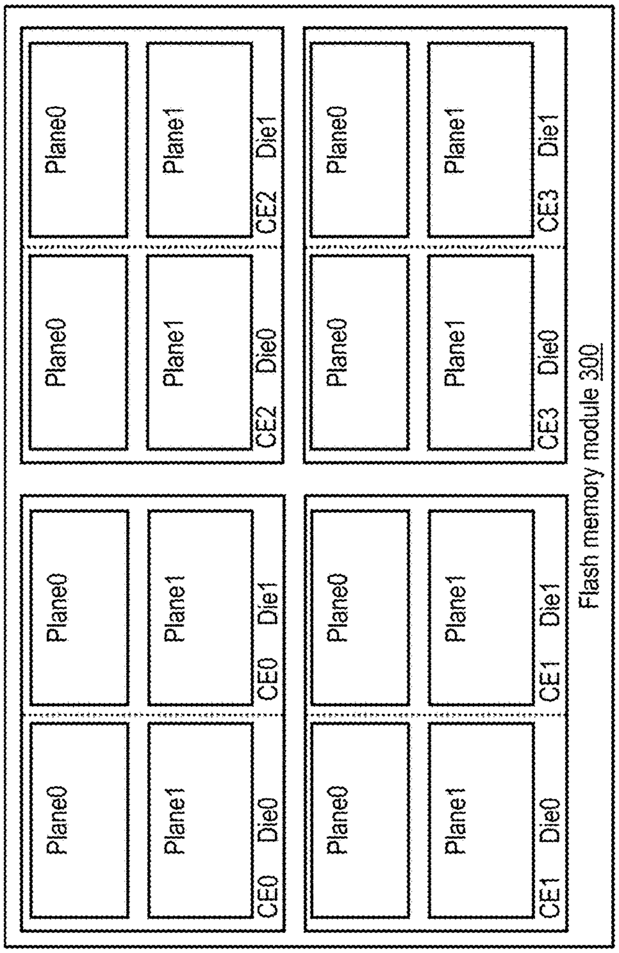

With reference now to FIG. 3, there is illustrated an exemplary embodiment of a flash memory module 300 that can be utilized to implement any of flash memory modules M0*a*-M15*b* of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
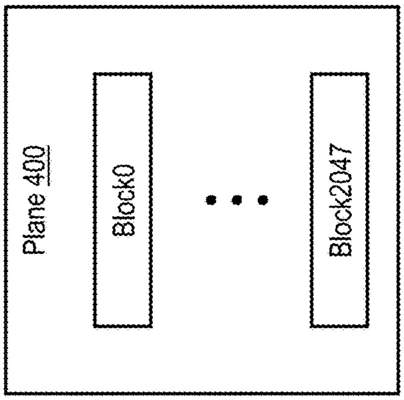
Figure 5:
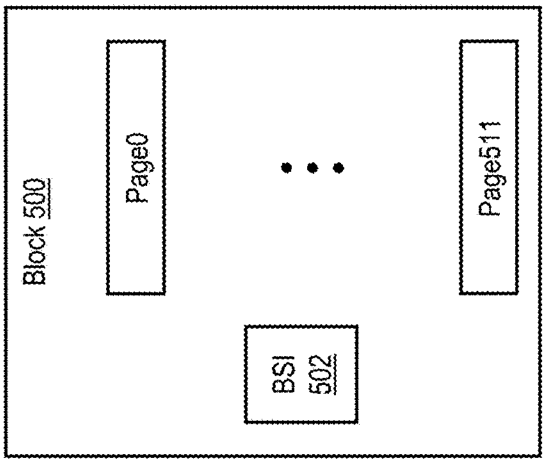

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes block status information (BSI) 502, which indicates the status of each physical page in that block 500 as retired (i.e., no longer used to store user data) or non-retired (i.e., active or still usable to store user data). In various implementations, BSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
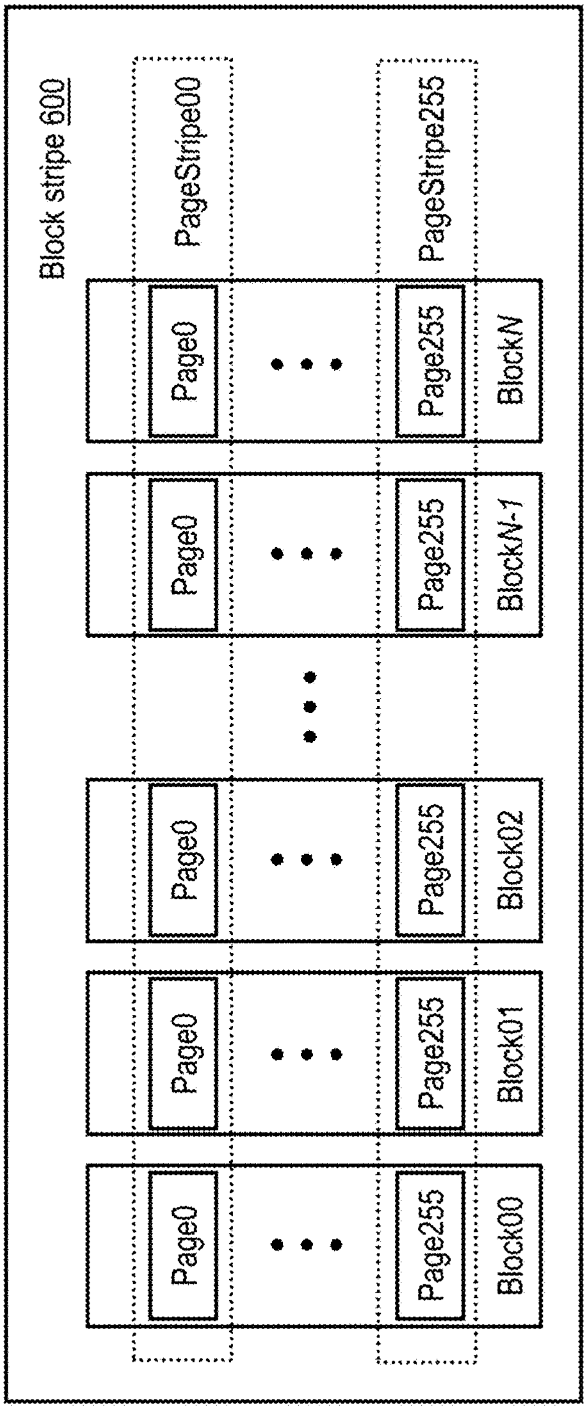
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
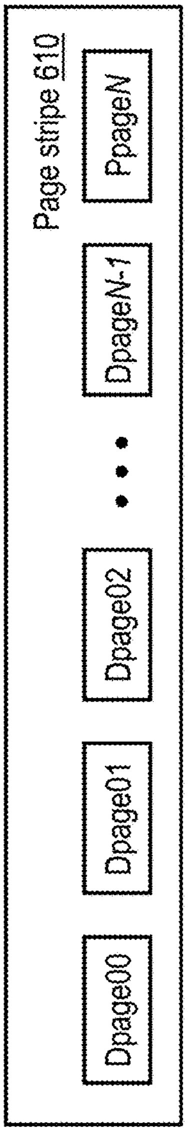
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

Figure 7:
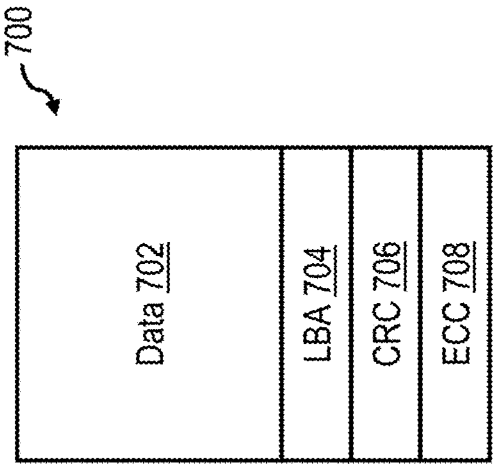
FIG. 7 illustrates an exemplary codeword stored in each data page in accordance with the present disclosure.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706. In case data field 702 holds fractions of logical data pages, LBA field 704 further holds information on which fractions of logical data pages are stored in data field 702.

Figure 8:
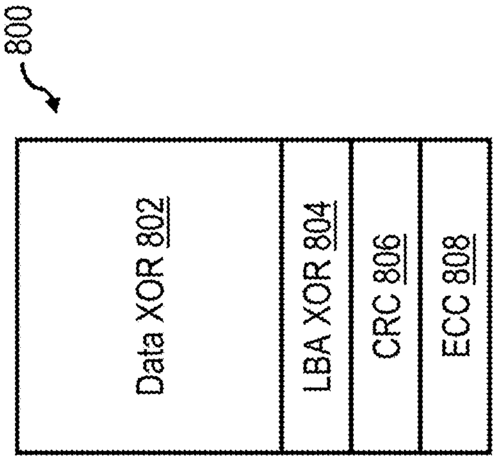
FIG. 8 depicts an exemplary codeword stored in each data protection page in accordance with the present disclosure.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of LBA fields 704 of codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Figure 9:
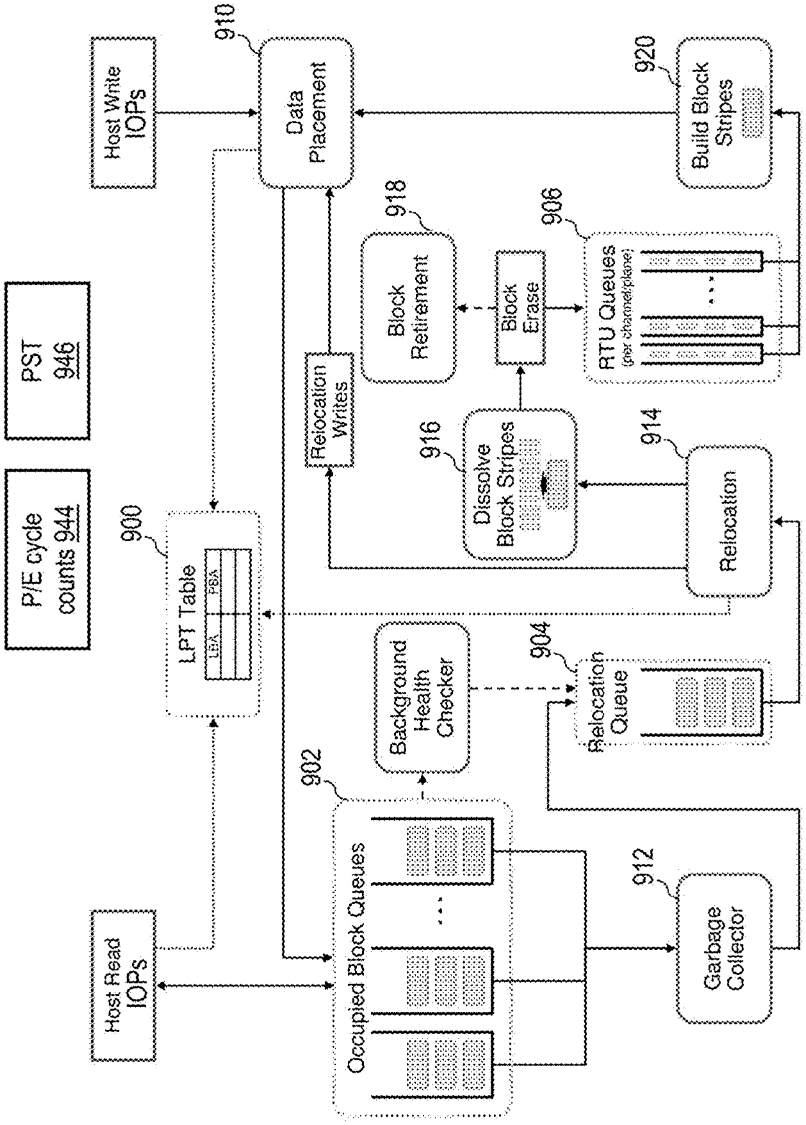
FIG. 9 is a high level flow diagram of the flash management functions and data structures employed by a flash controller in accordance with one embodiment.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of RTU queues 906 corresponding to its channel.

A build block stripes function 920 performed by flash management code running on GPP 132 constructs new block stripes for storing data and associated parity information from the erased blocks enqueued in RTU queues 906. Build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write TOP and any non-updated data (i.e., in case the write request is smaller than a logical page, there is still valid data which needs to be handled in a read-modify-write manner) from an existing page stripe, if any, targeted by the write TOP, and/or stores the write data of the write TOP and any non-updated (i.e., still valid) data from an existing page stripe, if any, targeted by the write TOP to an already allocated page stripe which has free space left. The page stripe may be allocated from either a block stripe already allocated to hold data or from a new block stripe built by build block stripes function 920. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on GPP 132 utilizes to facilitate garbage collection. As noted above, through the write process, pages are invalidated, and therefore portions of NAND flash memory system 150 become unused. An associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Each erased block is either retired (i.e., no longer used to store user data) by a block retirement function 918 among the flash management functions executed on GPP 132, or alternatively, prepared for reuse by placing the block's identifier on an appropriate ready-to-use (RTU) queue 906 in associated GPP memory 134.

Figure 10:
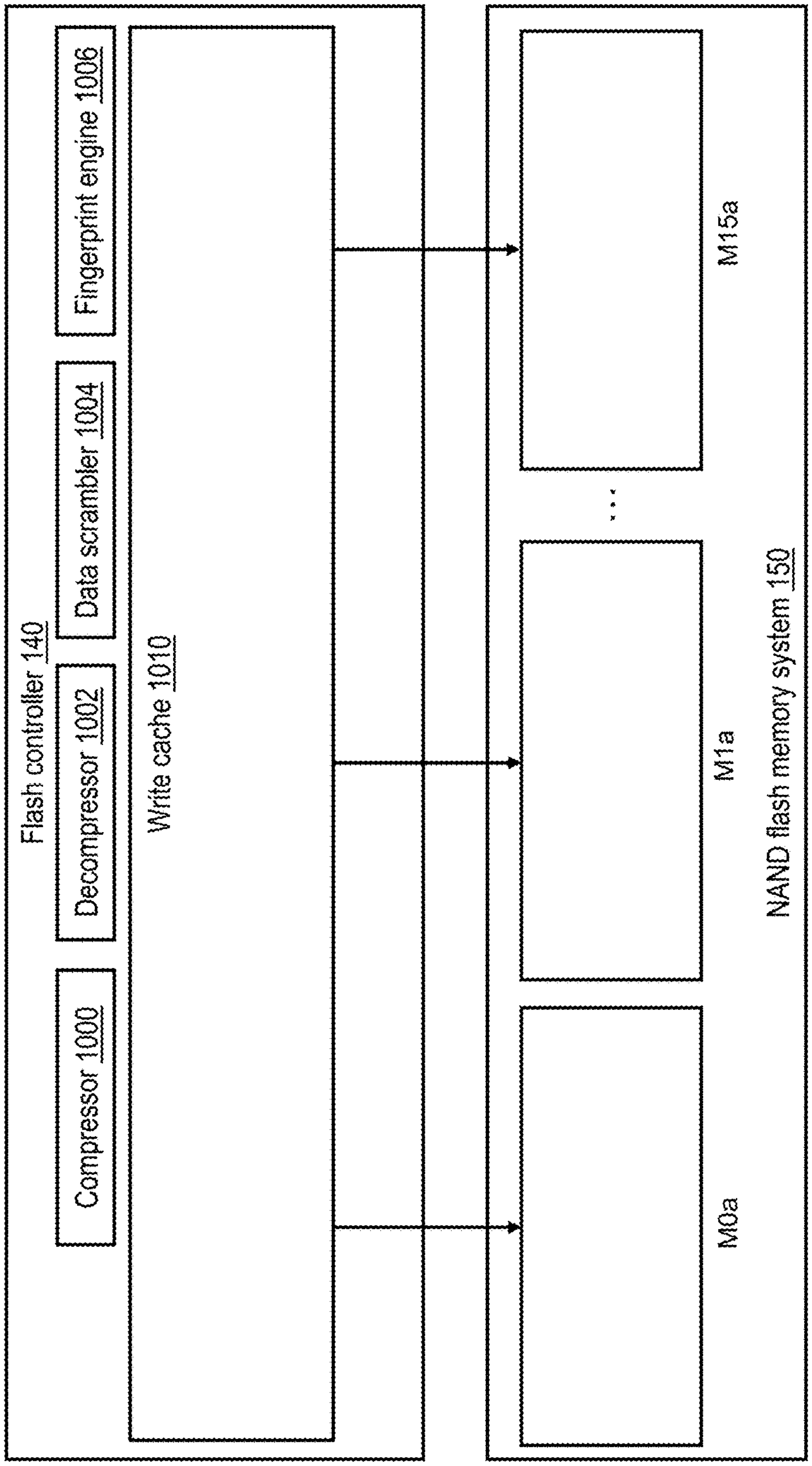
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0*a*, M0*b*, M1*a*, M1*b*, . . . , M1*a*, and M15*b* of a NAND flash memory system 150, for example, on a page-by-page basis rather than on a block-by-block basis, or a combination thereof. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 utilizes data scrambler 1004 to apply a predetermined data scrambling (i.e., randomization) pattern to data written to NAND flash memory 150 in order to improve endurance and mitigate cell-to-cell interference. As further illustrated in FIG. 10, flash controller 140 includes a write cache 1010. Write cache 1010 includes storage for one or more cache lines for buffering write data in anticipation of writing the data to NAND flash memory system 150.

According to aspects of the present disclosure, techniques for supporting in-place updates are implemented in order to reduce I/O amplification associated with unaligned writes. In the event an LBA-to-PBA mapping already exists for an unaligned user write, user data can be updated in-place at an existing PBA offset. Updating user data in-place at an existing PBA offset may, however, lead to stale data being serviced by an associated storage system when garbage collection is active. That is, between the time a garbage collector reads data for a PBA, allocates a new PBA to relocate the data, and writes the data to the new PBA there may be a window of time in which a user in-place update to the same PBA occurs, which may result in stale data being served in a future read.

Figure 11:
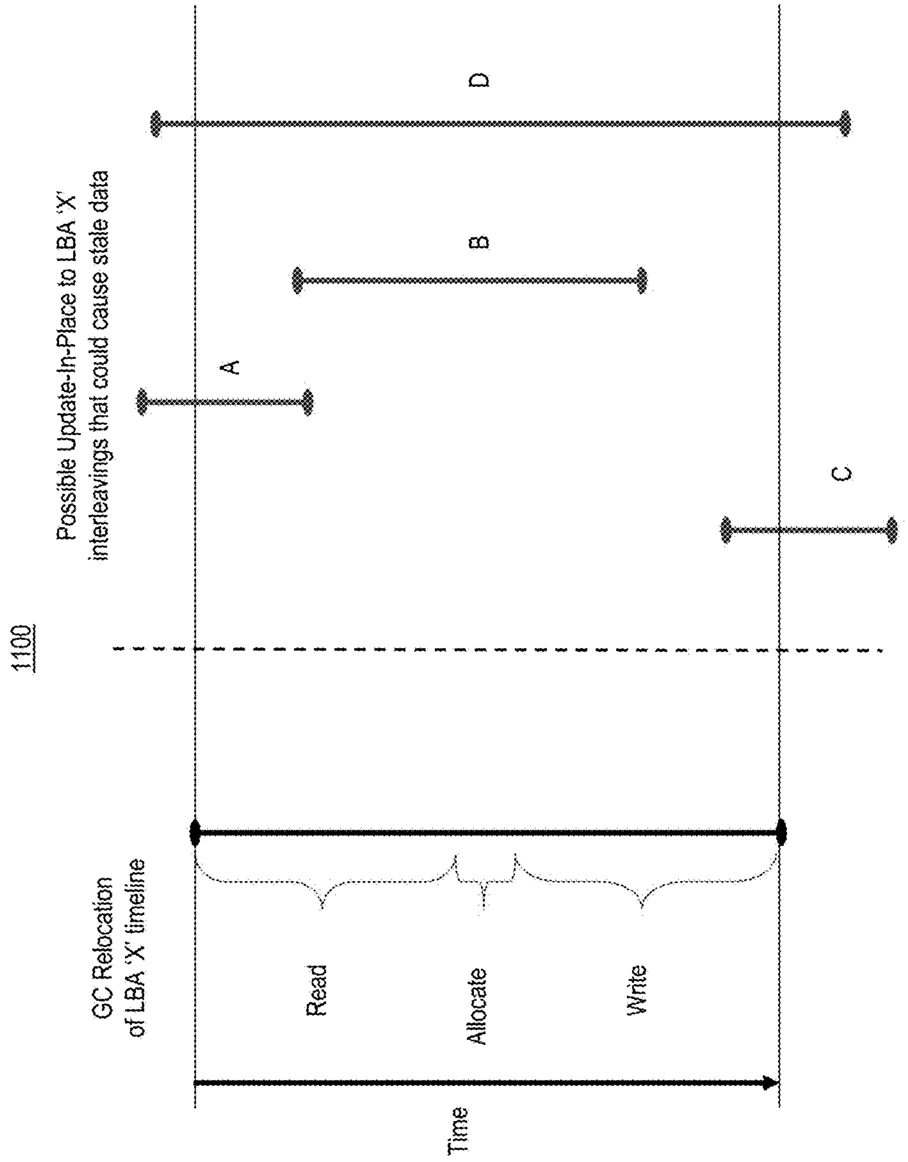
FIG. 11 is a diagram that depicts an exemplary garbage collection relocation of data at logical block address (LBA) 'X' in conjunction with a number of in-place updates to data at LBA 'X' that may result in stale data being read when the in-place updates are unaligned writes.

With reference to FIG. 11, a diagram 1100 illustrates a timeline in which a garbage collector is relocating a particular LBA 'X' and possible user in-place updates to LBA 'X' interleavings that may conventionally lead to stale data being served. More specifically, in FIG. 11, user in-place updates 'A', 'B', 'C', and 'D' may be lost since the garbage collection process may read an old version of the data, copy the old version of the data to a newly allocated PBA, and update the LBA mapping with the newly allocated PBA (which does not include the user in-place updates 'A', 'B', 'C', and 'D'. In this case, future reads to the LBA 'X' will return data from the newly updated PBA 'X', possibly missing the intermediate user in-place updates 'A', 'B', 'C', and 'D'. As is illustrated in-place update 'A' is initiated prior to garbage collection initiation and is completed during garbage collection. In-place update 'B' is initiated and completed during garbage collection. In-place update 'C' is initiated during garbage collection and is completed following garbage collection completion. Finally, in-place update 'D' is initiated prior to garbage collection initiation and is completed following garbage collection completion.

According to aspects of the present disclosure, to support in-place updates in the presence of garbage collection and guarantee correct execution in all cases, garbage collection relocation of an LBA is serialized with respect to in-flight in-place updates to the same LBA. As one example, garbage collection relocation of an LBA may be serialized with respect to in-flight in-place updates to the same LBA by requiring a garbage collector to wait until all in-flight in-place updates for a particular LBA quiesce before proceeding with garbage collection. However, merely requiring the garbage collector to wait until all in-flight in-place updates for a particular LBA quiesce before proceeding with garbage collection may lead to a live-lock scenario in the event there is always more than one outstanding in-place update to the same LBA, such that garbage collection of the LBA is prevented. According to the present disclosure, a live-lock scenario is avoided by prioritizing garbage collection over subsequent in-place updates. It should be appreciated that the reverse stagnation of user in-place updates is not possible since a garbage collector is guaranteed to not relocate a particular LBA that has not been updated-out-of-place and is thus pointing to the same PBA before and after the relocation, again for at least an LEB's worth of PBAs and usually much more than that, i.e., it is not possible to keep relocating the same PBA without several relocate I/Os worth of time in between.

In one or more embodiments, a shared data structure is implemented that tracks in-flight garbage collection operations and in-flight user in-place update operations. According to the present disclosure, an LBA can either be updated in-place (with more than one in-flight in-place updates) or be relocated (but a given LBA cannot be updated and relocated at the same time). According to one or more embodiments, when a garbage collector initiates relocation of a PBA, the garbage collector asserts a garbage collection bit for an associated LBA entry in an in-flight data structure (whether or not the LBA entry already exists or requires creation of an entry in the in-flight data structure). Any user in-place update that hits the same LBA after the garbage collection bit is set is then queued to be serviced after the PBA relocation completes. According to at least one embodiment, if a user write first causes an LBA entry to be inserted in the in-flight data structure (or causes a reference count for an existing LBA entry in the in-flight data structure to be incremented) and a garbage collection bit for the LBA entry is not set, then the garbage collector sets the garbage collection bit for the LBA entry and then waits until every in-place update to the associated LBA that had initiated before the garbage collection bit was set finishes before proceeding with the PBA relocation.

Figure 12:
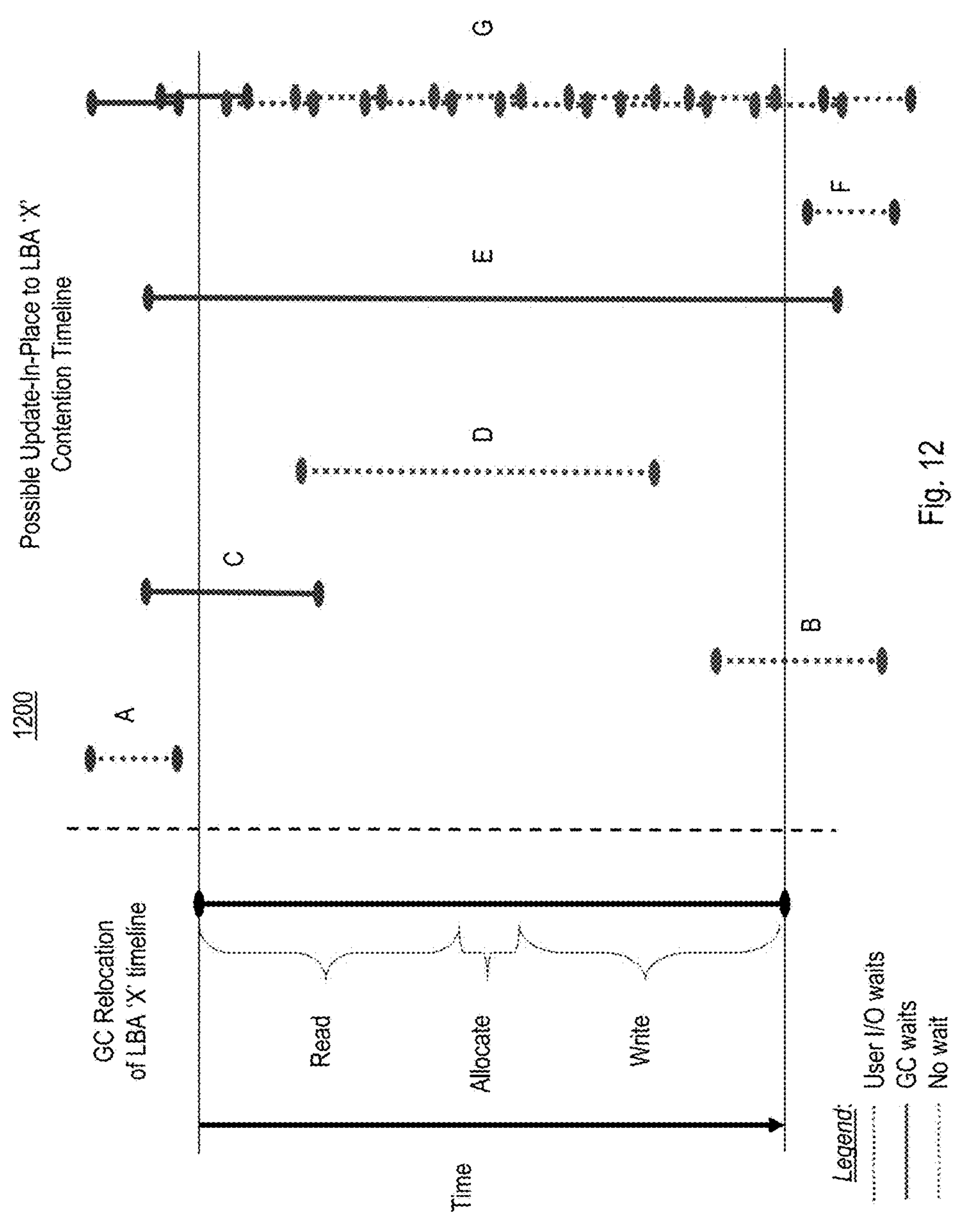
FIG. 12 is a diagram that depicts an exemplary garbage collection relocation of data at LBA 'X' in conjunction with a number of in-place updates to data at LBA 'X' in which waits may be introduced to prevent stale data from being read when the in-place updates are unaligned writes, according to an embodiment of the present disclosure.

With reference to FIG. 12, a diagram 1200 illustrates an exemplary behavior of a disclosed embodiment during an LBA 'X' relocation during garbage collection with respect to various in-flight in-place updates to LBA 'X' interleavings. In-place update 'A' occurs before the garbage collection window and, as such, requires no wait. In-place update 'B' occurs during and after the garbage collection window and, as such, the user I/O (i.e., in-place update 'B') is required to wait for the garbage collection window to close. In-place update 'C' occurs before and during the garbage collection window and, as such, the garbage collector is required to wait for the in-place update 'C' to complete. In-place update 'D' occurs during the garbage collection window and, as such, the user I/O (i.e., in-place update 'D') is required to wait for the garbage collection window to close. In-place update 'E' occurs before, during, and after the garbage collection window and, as such, the garbage collector is required to wait for the in-place update 'E' to complete. In-place update 'F' occurs after the garbage collection window and, as such, requires no wait.

The first portion of in-place updates 'G' that complete before the garbage collection window require no wait. The second portion of in-place updates 'G' that are initiated before but do not finish before the garbage collection window requires the garbage collector to wait. The intermediate portions of update-in-places 'G' that are initiated during the garbage collection window require the user I/Os to wait. The final portion of in-place updates 'G' that are initiated after the garbage collection window require no wait. The handling of reads and aligned writes are not addressed herein as the handling of reads and aligned writes does not require modification to conventional approaches to support in-place updates.

Figure 13:
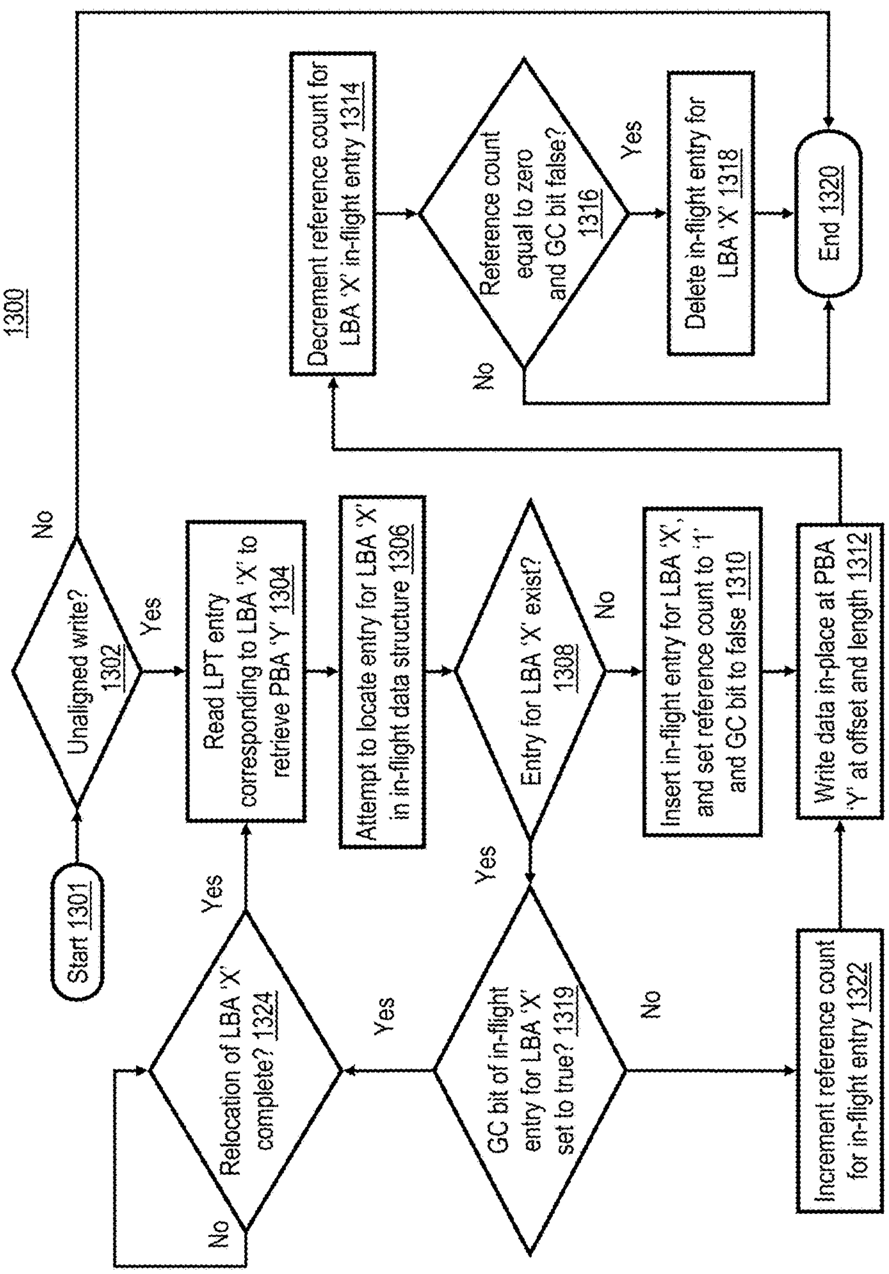
FIG. 13 is a high level logical flowchart of an exemplary process for handling an unaligned write in accordance with one embodiment of the present disclosure.

With reference to FIG. 13, an exemplary process 1300 is illustrated that handles unaligned-write requests. Process 1300 is initiated in block 1301 by, for example, flash controller 140 in response to receiving a write request. Next, in decision block 1302, flash controller 140 determines whether the received write request is an unaligned write request (e.g., for LBA 'X' at a specified offset and length). In response to the write request not being an unaligned write request control transfers from block 1302 to block 1320, where process 1300 terminates. In response to the write request being an unaligned write request control transfers from block 1302 to block 1304. In block 1304 flash controller 140 reads the LPT table entry (e.g., in LPT table 900) for LBA 'X' to retrieve an associated PBA 'Y'. Next, in block 1306, flash controller 140 performs a lookup in the 'in-flight data structure' (that is used to track in-place updates for unaligned-writes that are in-flight) in an attempt to locate an entry for LBA 'X'. As one example, the 'in-flight data structure' may be located within flash controller memory 142 (see FIG. 1C). As another example, the 'in-flight data structure' may be located within LPT table 900.

Then, in decision block 1308, flash controller 140 determines whether an entry for LBA 'X' was located in the 'in-flight data structure'. In response to flash controller 140 not locating an entry for LBA 'X' in block 1308 control transfers to block 1310. In block 1310 flash controller 140 inserts an entry for LBA 'X' in the 'in-flight data structure', sets an associated reference count to '1', and sets an associated garbage collection (GC) bit to false (e.g., logic level zero). Next, in block 1312, flash controller 140 writes data in-place at PBA 'Y', at the offset and length specified with the write request. Then, in block 1314, flash controller 140 decrements the reference count for the LBA 'X' entry in the 'in-flight data structure'.

Next, in decision block 1316, flash controller 140 determines whether the reference count for the LBA 'X' entry in the 'in-flight data structure' is zero (which indicates that there are no other in-flight unaligned-writes to LBA 'X') and whether the GC bit for LBA 'X' entry in the 'in-flight data structure' is false (e.g., zero), which indicates that garbage collection is inactive. In response to the reference count not being zero or the GC bit not being false for the LBA 'X' entry in the 'in-flight data structure' control transfers directly from block 1316 to block 1320. In response to the reference count being zero and the GC bit being false for the LBA 'X' entry in the 'in-flight data structure' control transfers from block 1316 to block 1318. In block 1318, flash controller 140 deletes the LBA 'X' entry in the 'in-flight data structure'. From block 1318 control transfers to block 1320.

In response to flash controller 140 locating an entry for LBA 'X' in block 1308 control transfers to decision block 1319. In block 1319 flash controller 140 determines whether the GC bit for the LBA 'X' entry in the 'in-flight data structure' is true (e.g., one), which indicates that garbage collection is active. In response to the GC bit being true for the LBA 'X' entry in the 'in-flight data structure' control transfers from block 1319 to block 1324. In block 1324 flash controller 140 waits for the relocation of LBA 'X' to complete (i.e., waits for garbage collection to complete for LBA 'X', as indicated by the GC bit for LBA 'X' being set to false in block 1418 of process 1400 in FIG. 14), at which point control then transfers from block 1324 to block 1304. In response to the GC bit not being true for the LBA 'X' entry in the 'in-flight data structure' control transfers from block 1319 to block 1322. In block 1322 flash controller 140 increments the reference count for the LBA 'X' entry in the 'in-flight data structure'. From block 1322 control transfers to block 1312.

Figure 14:
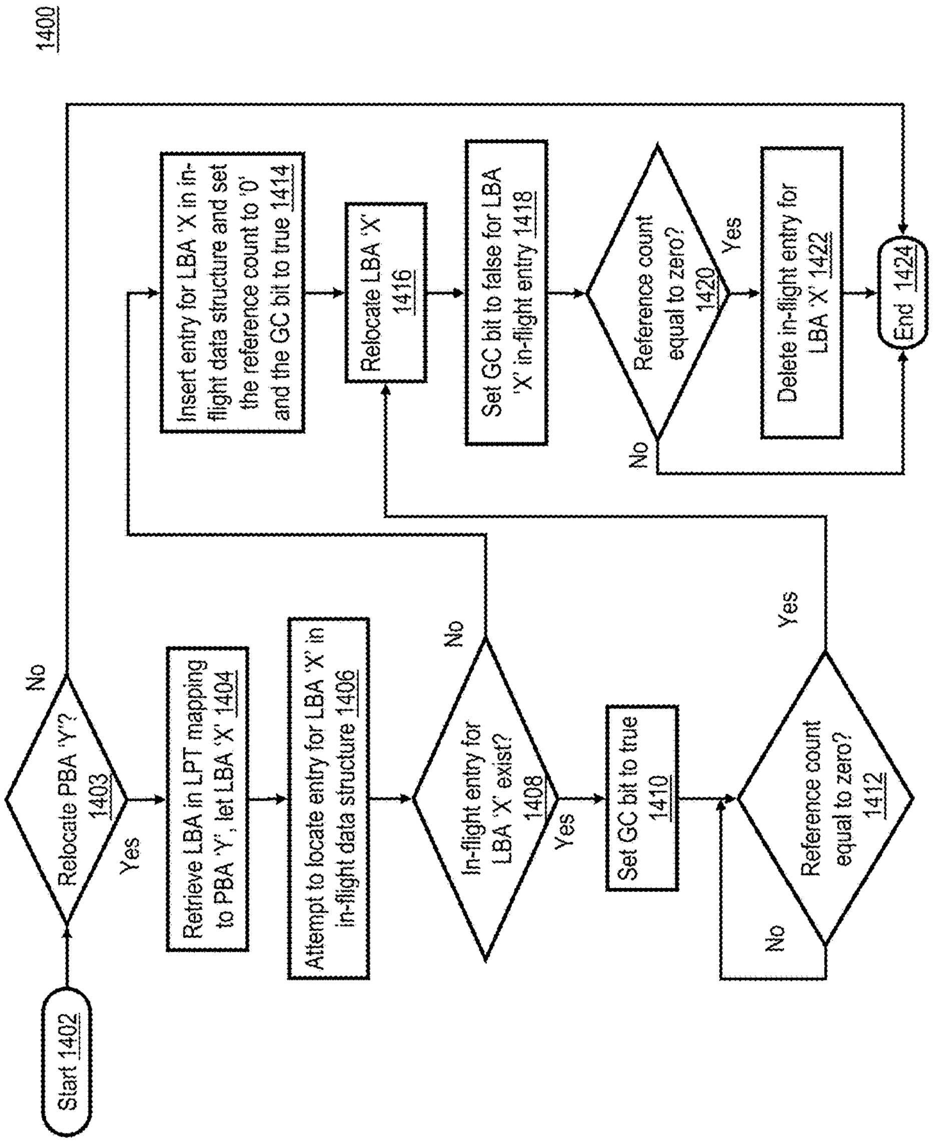
FIG. 14 is a high level logical flowchart of an exemplary process for relocating data at a physical block address (PBA) in accordance with one embodiment of the present disclosure.

With reference to FIG. 14, an exemplary process 1400 is illustrated that performs garbage collection. Process 1400 is initiated in block 1402 by, for example, garbage collector 912 (executing on flash controller 140) in response to available memory in flash memory system 150 being below a threshold level. Next, in decision block 1403, garbage collector 912 determines whether PBA 'Y' requires relocation, e.g., whether PBA 'Y' is included in a stripe that is to be garbage collected, and whether an LBA is mapped to PBA 'Y' in LPT table 900. In response to PBA 'Y' not requiring relocation control transfers to block 1424, where process 1400 terminates. In response to PBA 'Y' requiring relocation control transfers from block 1403 to block 1404. In block 1404 garbage collector 912 reads a back pointer for PBA 'Y' to retrieve LBA 'X' e.g., from the LBA 'X' entry in LPT table 900. Next, in block 1406, garbage collector 912 attempts to locate an entry for LBA 'X' in the 'in-flight data structure' (that is used to track in-place updates for unaligned-writes that are in-flight). As one example, the 'in-flight data structure' may be located within flash controller memory 142 (see FIG. 1C).

Then, in decision block 1408, garbage collector 912 determines whether an entry for LBA 'X' was located in the 'in-flight data structure'. In response to garbage collector 912 not locating an entry for LBA 'X' in block 1408 control transfers to block 1414. In block 1414 garbage collector 912 inserts an entry for LBA 'X' in the 'in-flight data structure', sets an associated reference count to '0', and sets an associated garbage collection (GC) bit to true (e.g., one). Next, in block 1416, garbage collector 912 relocates valid data associated with LBA 'X'. Then, in block 1418, garbage collector 912 sets the GC bit to false for the LBA 'X' entry in the 'in-flight data structure' (thereby releasing any unaligned writes for LBA 'X', see block 1324 of FIG. 13). Next, in decision block 1420, flash controller 140 determines whether the reference count for the LBA 'X' entry in the 'in-flight data structure' is zero (which indicates that there are no other in-flight unaligned-writes to LBA 'X'). In response to the reference count not being zero for the LBA 'X' entry in the 'in-flight data structure' control transfers directly from block 1420 to block 1424. In response to the reference count being zero for the LBA 'X' entry in the 'in-flight data structure' control transfers from block 1420 to block 1422. In block 1422, flash controller 140 deletes the LBA 'X' entry in the 'in-flight data structure'. From block 1422 control transfers to block 1424.

In response to garbage collector 912 locating an entry for LBA 'X' in block 1408 control transfers to block 1410. In block 1410, garbage collector 912 sets the GC bit for LBA 'X' in the 'in-flight data structure' to true (indicating to process 1300 that garbage collection is pending for LBA 'X' and that the LBA 'X' entry in the 'in-flight data structure' should not be deleted). Next, in decision block 1412, garbage collector 912 determines whether the reference count for LBA 'X' entry in the 'in-flight data structure' is zero (which indicates that there are no other in-flight unaligned-writes to LBA 'X' that were initiated before the garbage collection process that are still in process). In response to the reference count not being zero control loops on block 1412. In response to the reference count being zero control transfers from block 1412 to block 1416.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM), as well as traditional rotational hard drives (HDDs), Shingled magnetic recording hard drives (SMR HDDs) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of supporting in-place updates in a data storage system, comprising:
 in response to garbage collection for a logical block address (LBA) being indicated, determining, by a controller, whether an in-place update to the LBA is pending;
 in response to one or more in-place updates to the LBA being pending prior to the garbage collection for the LBA being indicated, initiating, by the controller, the garbage collection for the LBA following completion of the one or more in-place updates to the LBA;
 in response to the one or more in-place updates to the LBA not being pending prior to the garbage collection for the LBA being indicated, completing, by the controller, the garbage collection for the LBA prior to any subsequent in-place update to the LBA that occurs subsequent to initiation and prior to completion of the garbage collection for the LBA;
 in response to determining that an entry for the LBA is not in an in-flight data structure, inserting the entry for the LBA in the in-flight data structure, setting a reference count for the entry to one, and setting a garbage collection bit for the entry to false; and
 in response to determining that the entry for the LBA is in the in-flight data structure and that the garbage collection bit for the entry is false, incrementing the reference count for the entry.

2. The method of claim 1, further comprising:
 determining a physical block address (PBA) that corresponds to the LBA; and
 writing data in-place at the PBA at an offset and length specified by the in-place updates.

3. The method of claim 2, further comprising:
 decrementing the reference count for the entry subsequent to the writing data.

4. The method of claim 3, further comprising:
 in response to the reference count being equal to zero and the garbage collection bit being false, deleting the entry for the LBA in the in-flight data structure.

5. The method of claim 1, further comprising:
 in response to determining that the entry for the LBA is in the in-flight data structure and that the garbage collection bit for the entry is true, waiting for the garbage collection of the LBA to complete prior to writing data in-place for the in-place updates.

6. The method of claim 1, wherein the in-place updates are unaligned writes.

7. The method of claim 1, wherein the in-place updates correspond to two unaligned writes that overlap in time.

8. A data storage system, comprising:
 a flash memory system; and
 a flash controller coupled to the flash memory system, wherein the flash controller is configured to:
  in response to garbage collection for a logical block address (LBA) being indicated, determine whether an in-place update to the LBA is pending, wherein the LBA is associated with a physical block address (PBA) in the flash memory system;
  in response to one or more in-place updates to the LBA being pending prior to the garbage collection for the LBA being indicated, initiate the garbage collection for the LBA following completion of the one or more in-place updates to the LBA;
  in response to the one or more in-place updates to the LBA not being pending prior to the garbage collection for the LBA being indicated, complete the garbage collection for the LBA prior to any subsequent in-place update to the LBA that occurs subsequent to initiation and prior to completion of the garbage collection for the LBA;
 in response to determining that an entry for the LBA is not in an in-flight data structure, insert the entry in the in-flight data structure, set a reference count for the entry to one, and set a garbage collection bit for the entry to false; and
  in response to determining that the entry for the LBA is in the in-flight data structure and that the garbage collection bit for the entry is false, increment the reference count for the entry.

9. The data storage system of claim 8, wherein the controller is further configured to:
 determine the PBA that corresponds to the LBA; and
 write data in-place at the PBA at an offset and length specified by the in-place updates.

10. The data storage system of claim 9, wherein the controller is further configured to:
 decrement the reference count for the entry subsequent to the writing data.

11. The data storage system of claim 10, wherein the controller is further configured to:
 in response to the reference count being equal to zero and the garbage collection bit being false, delete the entry for the LBA in the in-flight data structure.

12. The data storage system of claim 8, wherein the controller is further configured to:
 in response to determining that the entry for the LBA is in the in-flight data structure and that the garbage collection bit for the entry is true, wait for the garbage collection of the LBA to complete prior to writing data in-place for the in-place updates.

13. The data storage system of claim 8, wherein the in-place updates are unaligned writes.

14. The data storage system of claim 8, wherein the in-place updates correspond to two unaligned writes that overlap in time.

15. A computer program product, the computer program product comprising a computer readable storage medium having program instructions embodied therein, the program instructions executable by a controller, to cause the controller to:
 in response to garbage collection for a logical block address (LBA) being indicated, determine whether an in-place update to the LBA is pending, wherein the LBA is associated with a physical block address (PBA) in the flash memory system;
 in response to one or more in-place updates to the LBA being pending prior to the garbage collection for the LBA being indicated, initiate the garbage collection for the LBA following completion of the one or more in-place updates to the LBA;
 in response to the one or more in-place updates to the LBA not being pending prior to the garbage collection for the LBA being indicated, complete the garbage collection for the LBA prior to any subsequent in-place update to the LBA that occurs subsequent to initiation and prior to completion of the garbage collection for the LBA;

in response to determining that an entry for the LBA is not in an in-flight data structure, insert the entry in the in-flight data structure, set a reference count for the entry to one, and set a garbage collection bit for the entry to false; and in response to determining that the entry for the LBA is in the in-flight data structure and that the garbage collection bit for the entry is false, increment the reference count for the entry.

16. The program product of claim 15, wherein the program instructions executable by the controller, are further configured to cause the controller to:

determine the PBA that corresponds to the LBA; and write data in-place at the PBA at an offset and length specified by the in-place updates.

17. The program product of claim 15, wherein the program instructions executable by the controller, are further configured to cause the controller to:

in response to determining that the entry for the LBA is in the in-flight data structure and that the garbage collection bit for the entry is true, wait for the garbage collection of the LBA to complete prior to writing data in-place for the in-place updates.

* * * * *